United States Patent
Altenritter et al.

(10) Patent No.: US 10,238,235 B2
(45) Date of Patent: Mar. 26, 2019

(54) MULTI-FUNCTION GRILLING DEVICE WITH ROTATIONALLY OPERABLE UPPER HEATING PLATE

(71) Applicant: WHIRLPOOL CORPORATION, Benton Harbor, MI (US)

(72) Inventors: Daniel A. Altenritter, Kalamazoo, MI (US); Christopher L. Carpenter, Pearisburg, VA (US); Steven C. Drees, Stevensville, MI (US); Yen-Hsi Lin, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 531 days.

(21) Appl. No.: 14/980,058

(22) Filed: Dec. 28, 2015

(65) Prior Publication Data
US 2017/0181574 A1    Jun. 29, 2017

(51) Int. Cl.
*A47J 37/06*    (2006.01)

(52) U.S. Cl.
CPC .... *A47J 37/0611* (2013.01); *A47J 2037/0617* (2013.01)

(58) Field of Classification Search
CPC .... A47J 37/0611; A47J 37/0885; A47J 43/18; A47J 2037/061
USPC .......... 99/339, 351, 349, 331–332, 372–384, 99/391, 425–426; 219/379, 386, 332, 219/387, 465, 524–525
See application file for complete search history.

(56) References Cited

U.S. PATENT DOCUMENTS

| | | | |
|---|---|---|---|
| 3,998,145 A | 12/1976 | Maisch | |
| 4,488,480 A * | 12/1984 | Miller | A47J 37/044 198/814 |
| 4,697,504 A * | 10/1987 | Keating | A47J 37/0676 126/41 R |
| 4,987,827 A | 1/1991 | Marquez | |
| 6,089,144 A | 7/2000 | Garber et al. | |
| 6,433,312 B1 | 8/2002 | Chen | |
| 7,717,028 B2 | 5/2010 | Serra | |
| 8,122,816 B2 | 2/2012 | Yu | |
| 8,261,657 B2 | 9/2012 | Serra et al. | |
| 8,621,986 B2 | 1/2014 | Serra et al. | |
| 8,915,178 B2 | 12/2014 | Chen et al. | |
| 2010/0132566 A1* | 6/2010 | Serra | A47J 37/0611 99/331 |
| 2014/0220196 A1* | 8/2014 | Veloo | A47J 37/0611 426/233 |

FOREIGN PATENT DOCUMENTS

WO    2008043124    4/2008

* cited by examiner

*Primary Examiner* — Ibrahime A Abraham
*Assistant Examiner* — Chris Liu
(74) *Attorney, Agent, or Firm* — Price Heneveld LLP

(57) ABSTRACT

A grilling device includes a housing includes a fixed lower heating plate and a rotatable swing arm disposed at a primary pivot positioned proximate a rear end of the housing. An operable upper heating plate is coupled to the swing arm such that an intermediate portion of the swing arm rotationally engages a central portion of the upper heating plate at a secondary pivot to define an adjacent face-up position, a stacked face-up position and a face-down position. A leveling mechanism maintains the upper heating plate in parallel with the lower heating plate as the swing arm operates about at least a portion of the primary pivot.

16 Claims, 15 Drawing Sheets

MULTI-FUNCTION GRILLING DEVICE WITH ROTATIONALLY OPERABLE UPPER HEATING PLATE

FIELD OF THE DEVICE

The present device generally relates to countertop cooking appliances, and more specifically, a grilling appliance having a rotationally operable upper heating plate that can be configured into a plurality of heating positions.

BACKGROUND

Various kitchen cooking appliances can include countertop grills that have upper and lower grills for cooking two sides of a food item between the upper and lower grills. Such devices can be used to make Panini-type sandwiches or can be used for general cooking and various food items. Typically, these countertop cooking appliances are small enough to be carried by hand from one spot to another within the kitchen.

SUMMARY

In at least one aspect, a grilling device includes a housing having a fixed lower heating plate and a rotatable swing arm disposed at a primary pivot positioned proximate a rear end of the housing. An operable upper heating plate is coupled to the swing arm such that an intermediate portion of the swing arm rotationally engages a central portion of the upper heating plate at a secondary pivot to define an adjacent face-up position, a stacked face-up position and a face-down position. A leveling mechanism maintains the upper heating plate in parallel with the lower heating plate as the swing arm operates about at least a portion of the primary pivot.

In at least another aspect, a grilling device includes a lower heating plate. An upper heating plate is operably coupled to the lower heating plate by a swing arm and the upper heating plate is rotatable about an intermediate portion of the swing arm between an adjacent face-up position, a stacked face-up position, and a face down position.

In at least another aspect, a multi-function grilling device includes an upward-facing lower cooking surface. An operable cooking surface is rotatable about a functional pivot between a plurality of rotational positions. A swing arm is rotatable about a primary pivot and extending from the lower cooking surface to at least the functional pivot, wherein the swing arm and the plurality of rotational positions of the operable cooking surface cooperate to define at least a stacked face-up position and a face-down position.

These and other features, advantages, and objects of the present device will be further understood and appreciated by those skilled in the art upon studying the following specification, claims, and appended drawings.

DETAILED DESCRIPTION OF EMBODIMENTS

Figure 1:
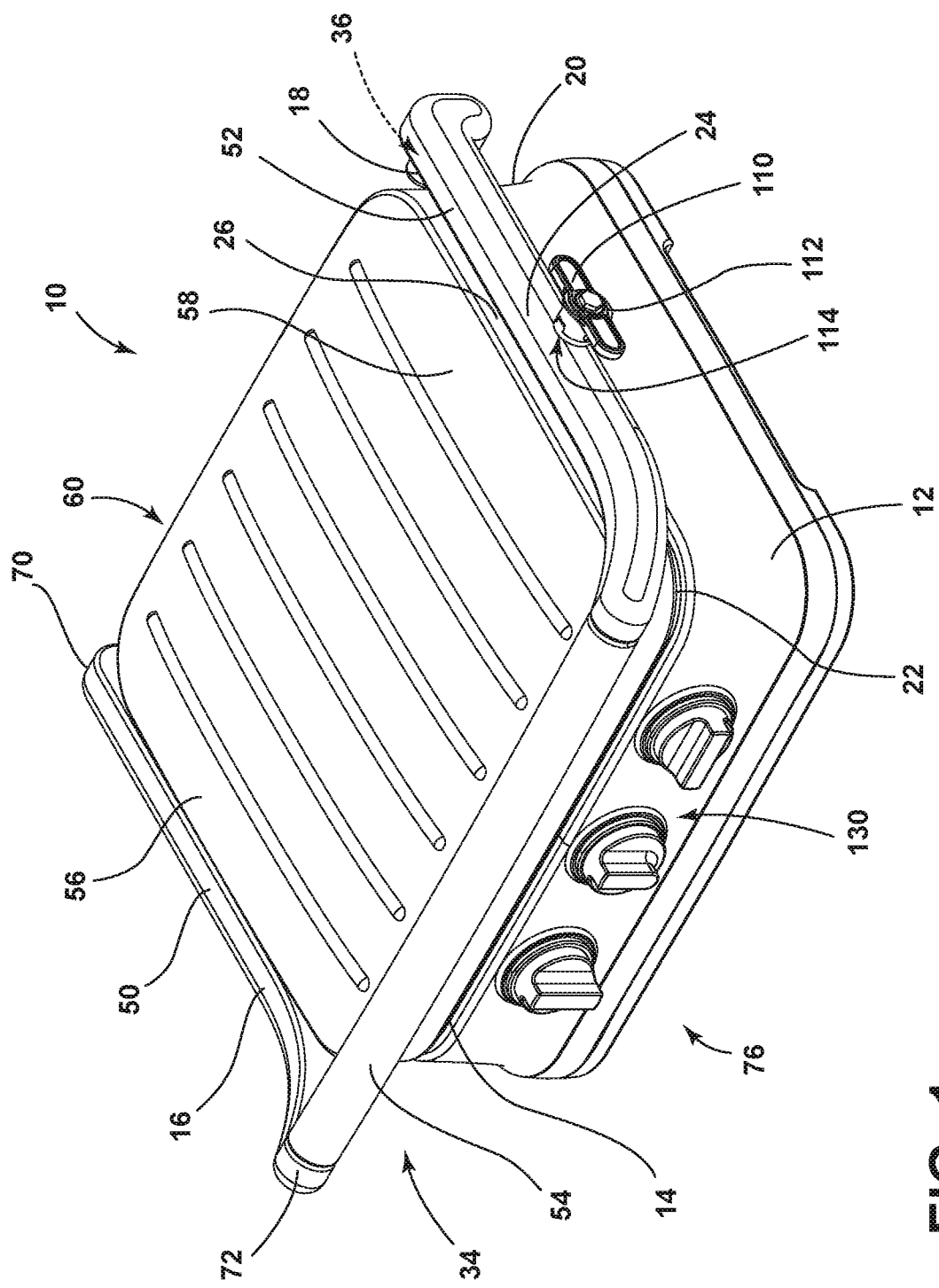
FIG. 1 is a first top perspective view of an embodiment of the multi-function grilling device.
Figure 2:
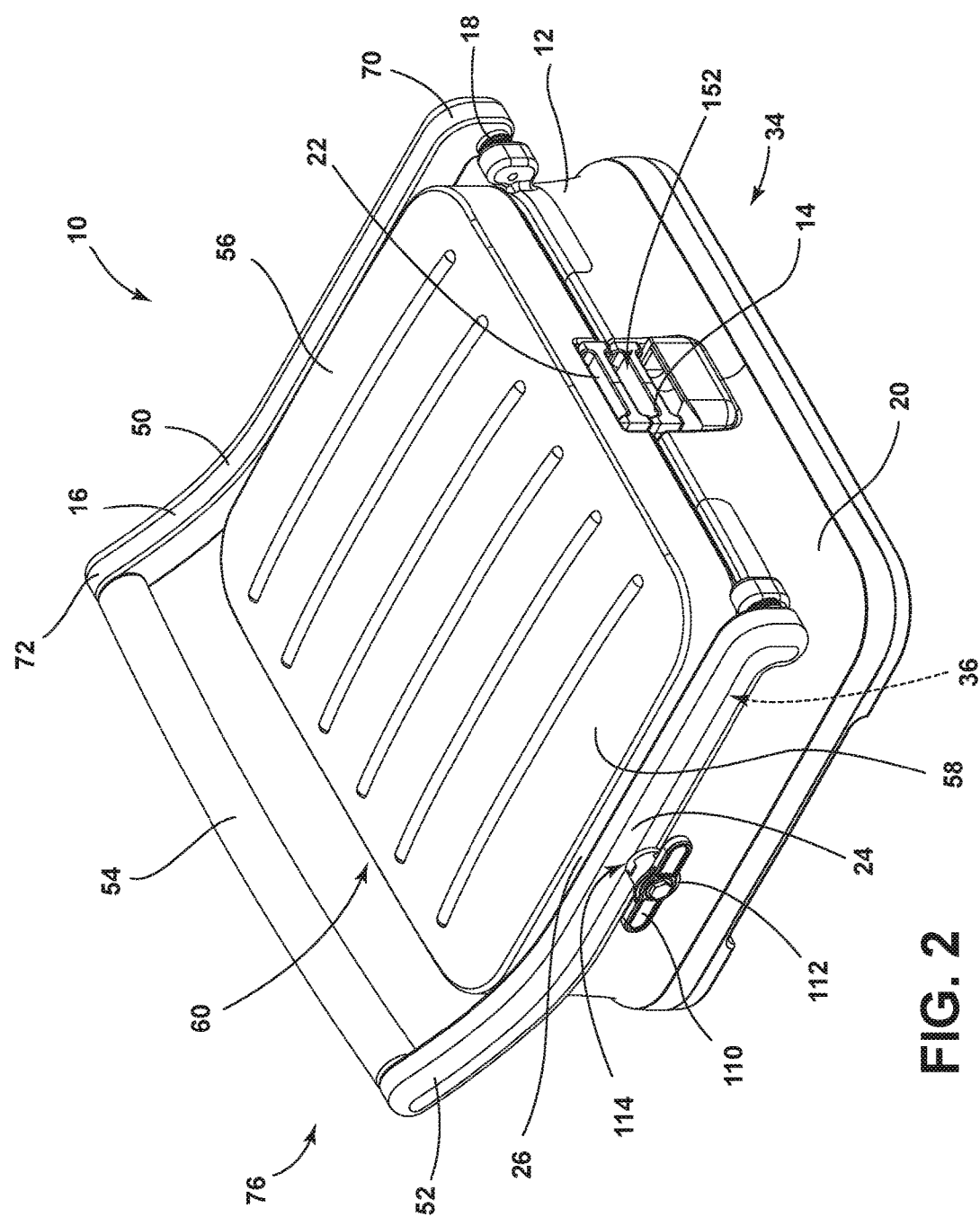
FIG. 2 is a second top perspective view of the multi-function grilling device of FIG. 1.
Figure 3:
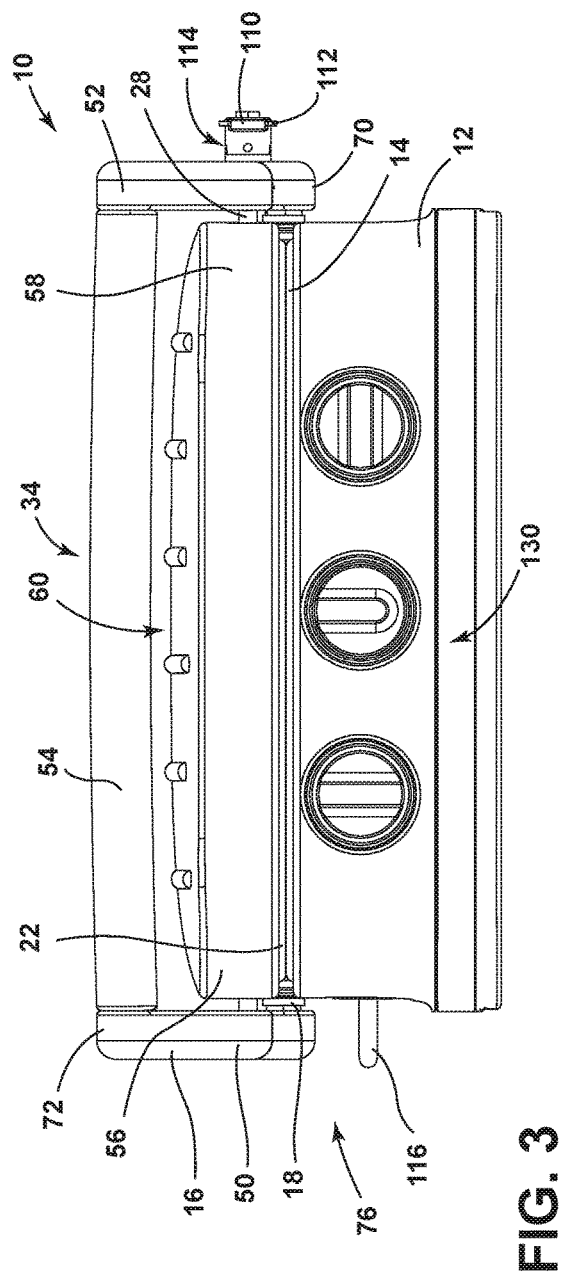
FIG. 3 is a first side elevational view of the multi-function grilling device of FIG. 1.
Figure 4:
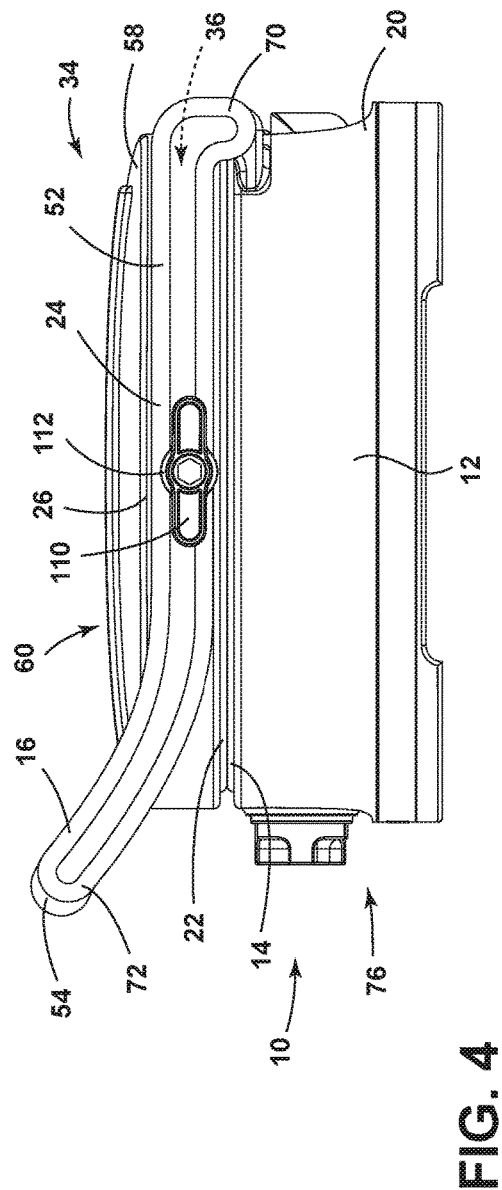
FIG. 4 is a second side elevational view of the multi-function grilling device of FIG. 1.
Figure 5:
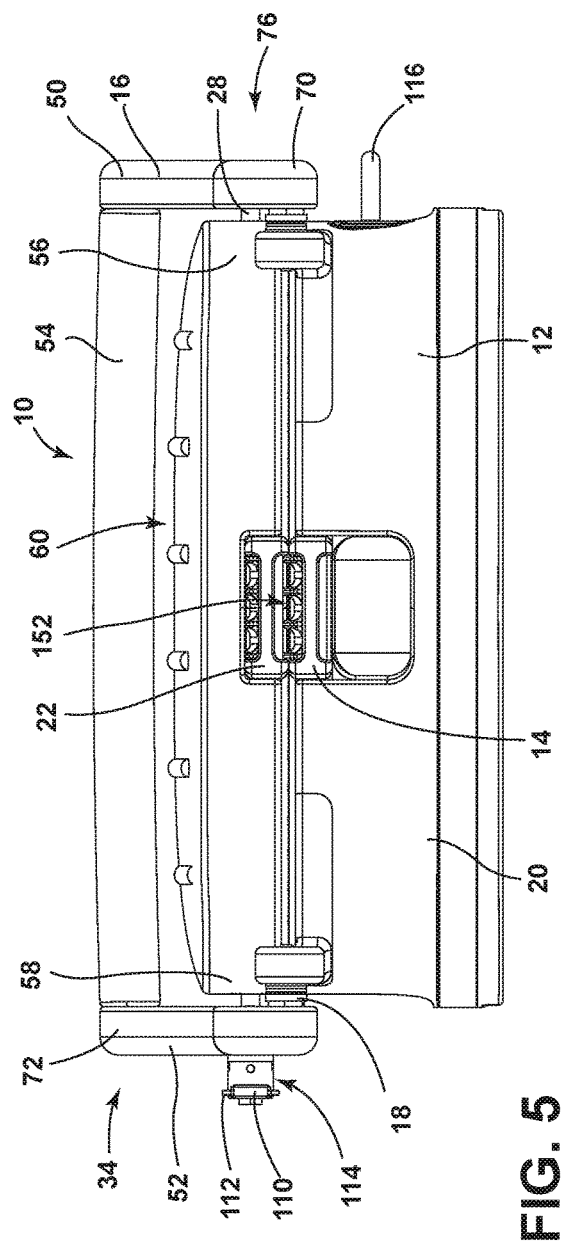
FIG. 5 is a third side elevational view of the multi-function grilling device of FIG. 1.
Figure 6:
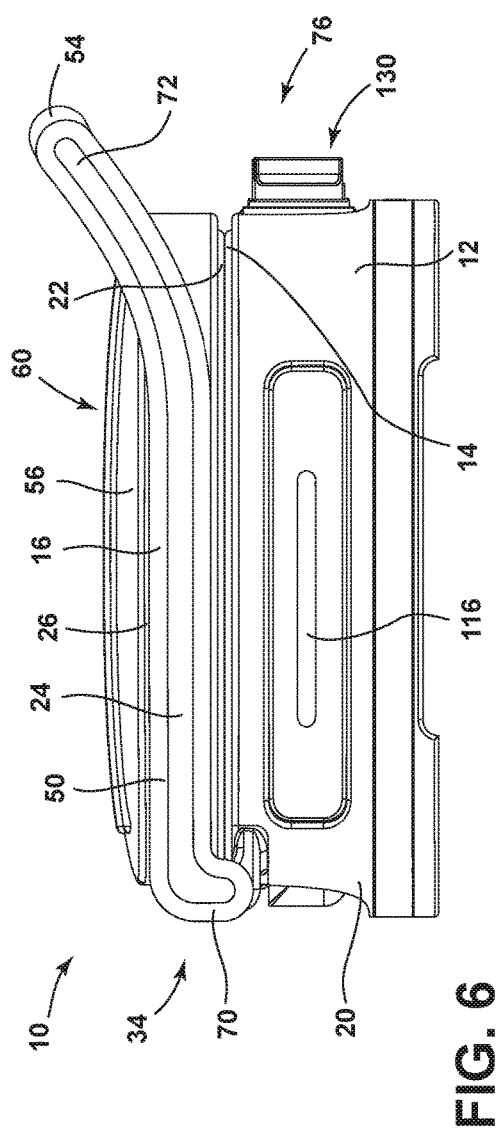
FIG. 6 is a fourth side elevational view of the multi-function grilling device of FIG. 1.
Figure 7:
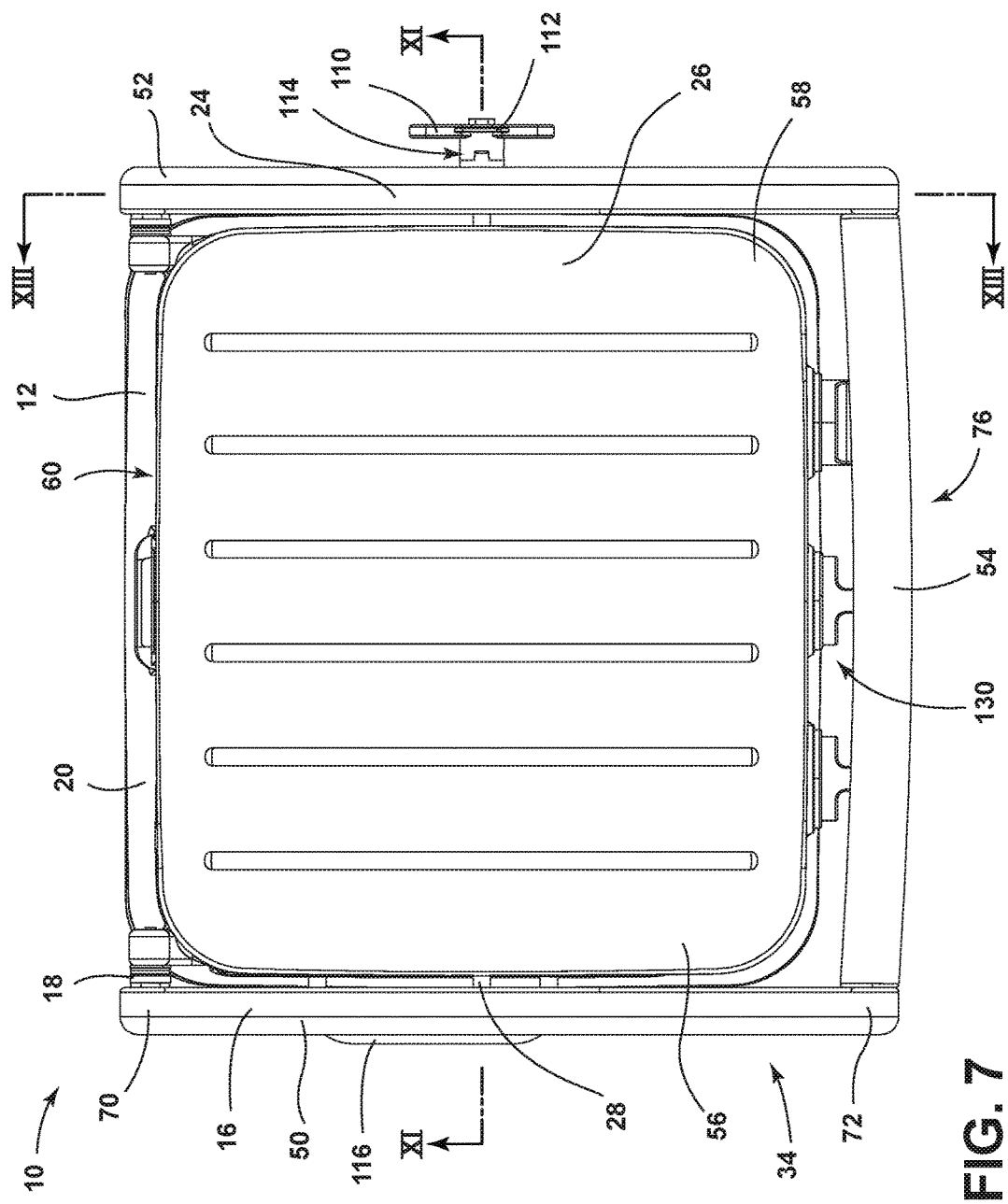
FIG. 7 is a top plan view of the multi-function grilling device of FIG. 1.
Figure 8:
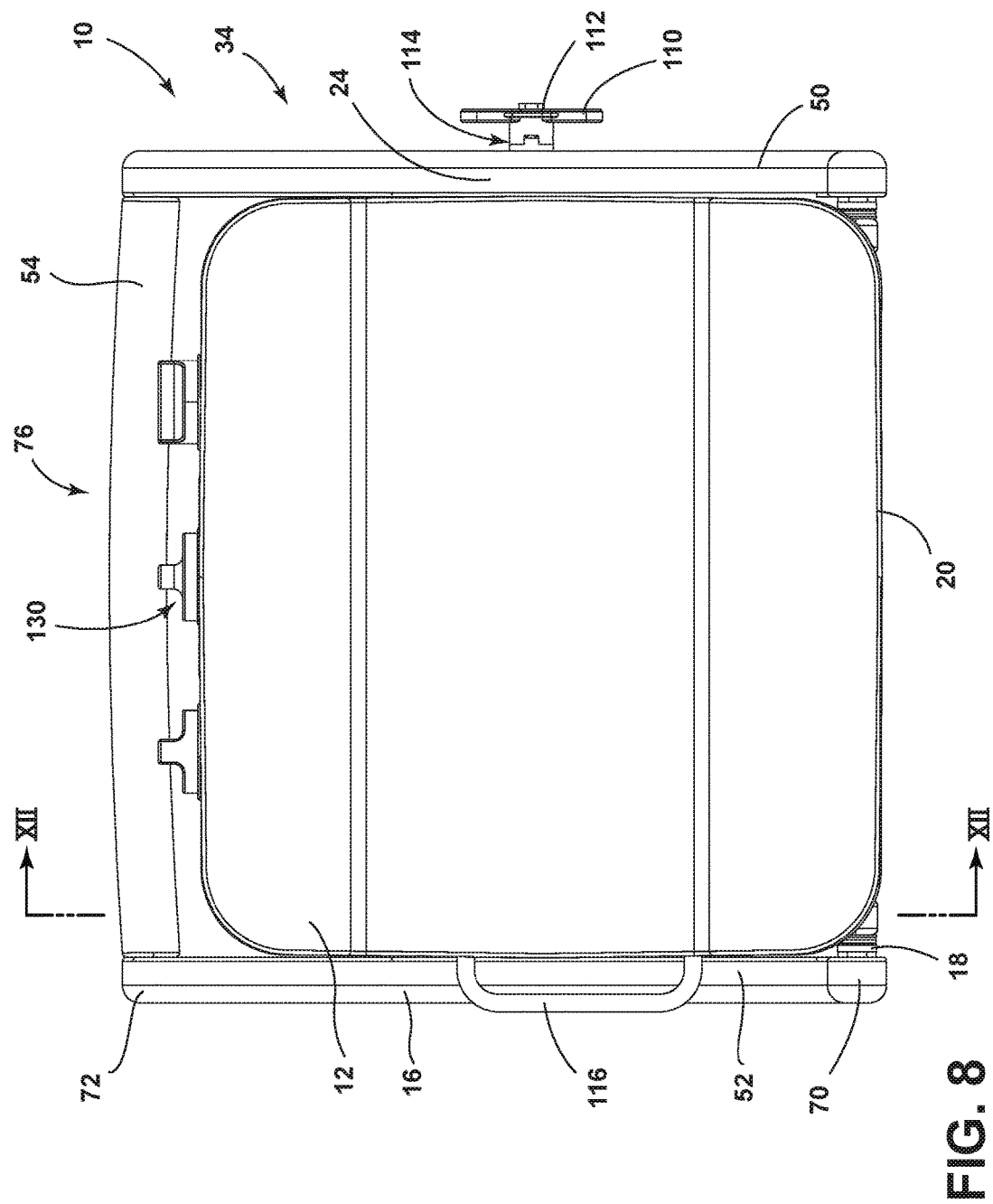
FIG. 8 is a bottom plan view of the multi-function grilling device of FIG. 1.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a multi-function grilling device, according to one embodiment. The multi-function grilling device 10 includes a housing 12 having a fixed lower heating plate 14 and a rotatable swing arm 16 disposed at a primary pivot 18 positioned proximate a rear end 20 of the housing 12. An operable upper heating plate 22 is coupled to the swing arm 16, such that an intermediate portion 24 of the swing arm 16 rotationally engages a central portion 26 of the upper heating plate 22 at a functional or secondary pivot 28 to define an adjacent face-up position 30 (shown in FIG. 15), a stacked face-up position 32 (shown in FIG. 14) and a face-down position 34. A leveling mechanism 36 is disposed within the multi-function grilling device 10 that maintains the upper heating plate 22 in parallel with the lower heating plate 14 as the swing arm 16 operates about at least a portion of the primary pivot 18.

Referring again to the embodiment illustrated in FIGS. 1-9, the swing arm 16 of the multi-function grilling device 10 can include left and right arm portions 50, 52 having a swing arm handle 54 disposed therebetween. The left and right arm portions 50, 52 can each connect with the secondary pivot 28 that engages a central portion 26 of the operable upper heating plate 22, where the central portion 26 can be defined by the midpoint of each of the left and right sides 56, 58 of the upper heating plate 22. According to various embodiments, the upper heating plate 22 can include an upper housing 60 within which the upper heating plate 22 is installed and to which the intermediate portions 24 of the swing arm 16 can engage.

According to the various embodiments, the operable upper heating plate 22 is configured to rotate about the secondary pivot 28 at least 180° and in some embodiments, up to 360°. It is contemplated that in various embodiments, the operable upper heating plate 22 can rotate about the secondary pivot 28 more than 360°. In such an embodiment, various electrical wiring leading from the housing 12 to the upper heating plate 22 can be made through a rotatable wiring connection such that the upper heating plate 22 can rotate more than 360° without the electrical wiring becoming tangled, twisted, or otherwise damaged during rotation of the upper heating plate 22.

Referring again to FIGS. 1-9, the left and right arm portions 50, 52 of the swing arm 16 extend from respective first ends 70 that can define the location of the primary pivot 18 rotationally connecting the left and right arm portions 50, 52 to the housing 12 of the multi-function grilling device 10. Second ends 72 of the right and left swing arm portions 52, 50 can define the location of the swing arm handle 54 that allows a user to operate the swing arm 16 between a raised position 74 (shown in FIGS. 14-17) and a lowered position 76. In operation, the raised and lowered positions 74, 76 allow the user to rotate the operable upper heating plate 22 about the primary pivot 18 and also allow the user to open and close the multi-function grilling device 10 to insert, remove, observe, or otherwise prepare food placed within a heating zone 82 of multi-function grilling device 10 defined by the upward-facing lower cooking surface 78 of the lower heating plate 14 and the operable cooking surface 80 of the upper heating plate 22.

Referring now to the embodiment illustrated in FIGS. 1-13, the multi-function grilling device 10 can include the leveling mechanism 36 that includes a band 90 that is disposed around the primary and secondary pivots 18, 28. A tensioning mechanism 92 is disposed within the leveling mechanism 36. The tensioning mechanism 92 is a member having a slidable outer surface 94 that intrudes into the natural path of the band 90 to deflect at least a portion of the band 90 such that the band 90 wraps circumferentially around at least one of the primary and secondary pivots 18, 28 greater than 180°. According to the various embodiments, the tensioning mechanism 92 limits slippage by the band 90 as the swing arm 16 is moved between the raised and lowered positions 74, 76 by causing the band 90 to wrap around more of one or both of the primary and secondary pivots 18, 28. Accordingly, the band 90 is in greater physical contact with one or both of the primary and secondary pivots 18, 28 during operation of the multi-function grilling device 10.

Figure 9:
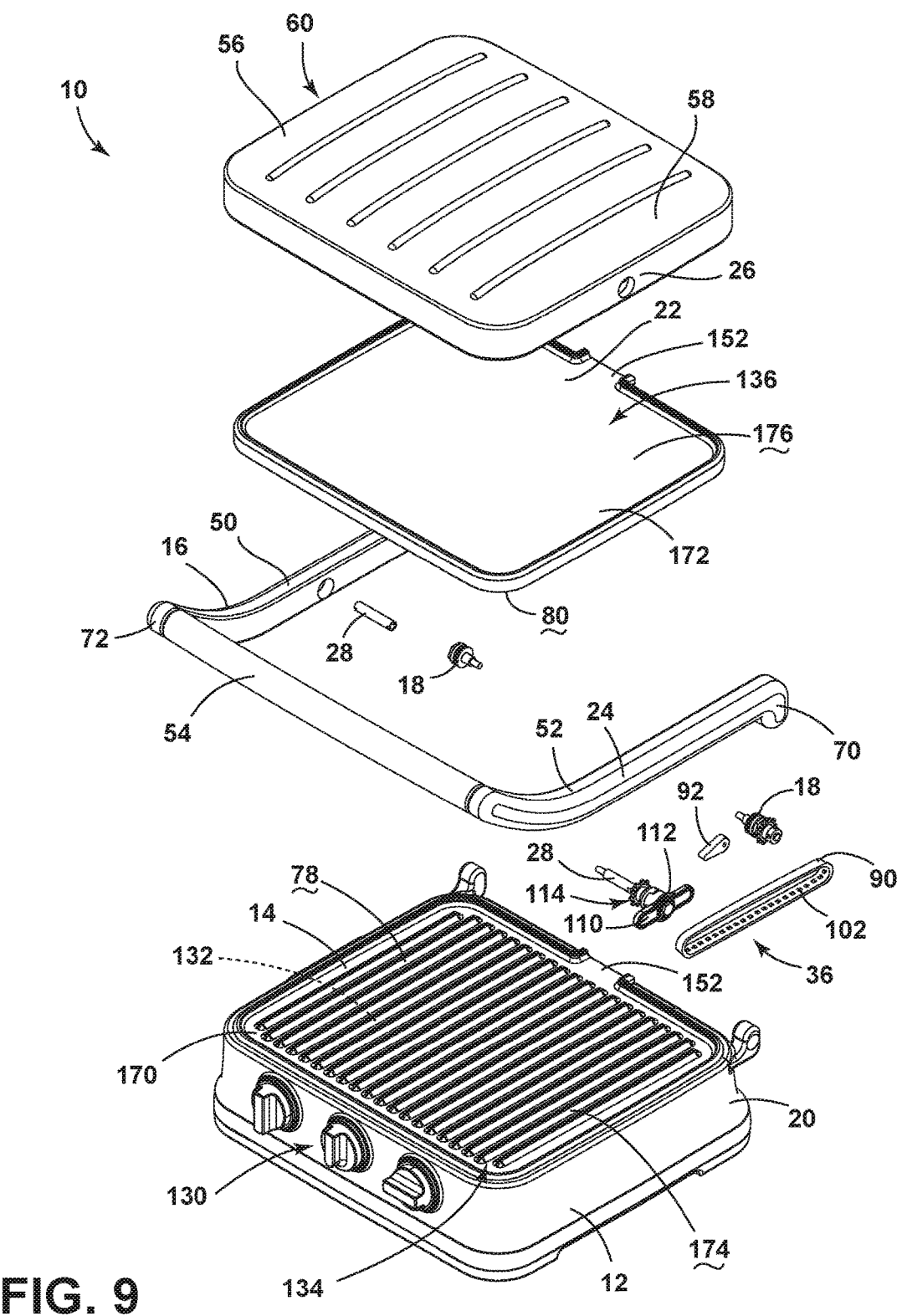
FIG. 9 is an exploded perspective view of the multi-function grilling device of FIG. 1.
Figure 10:
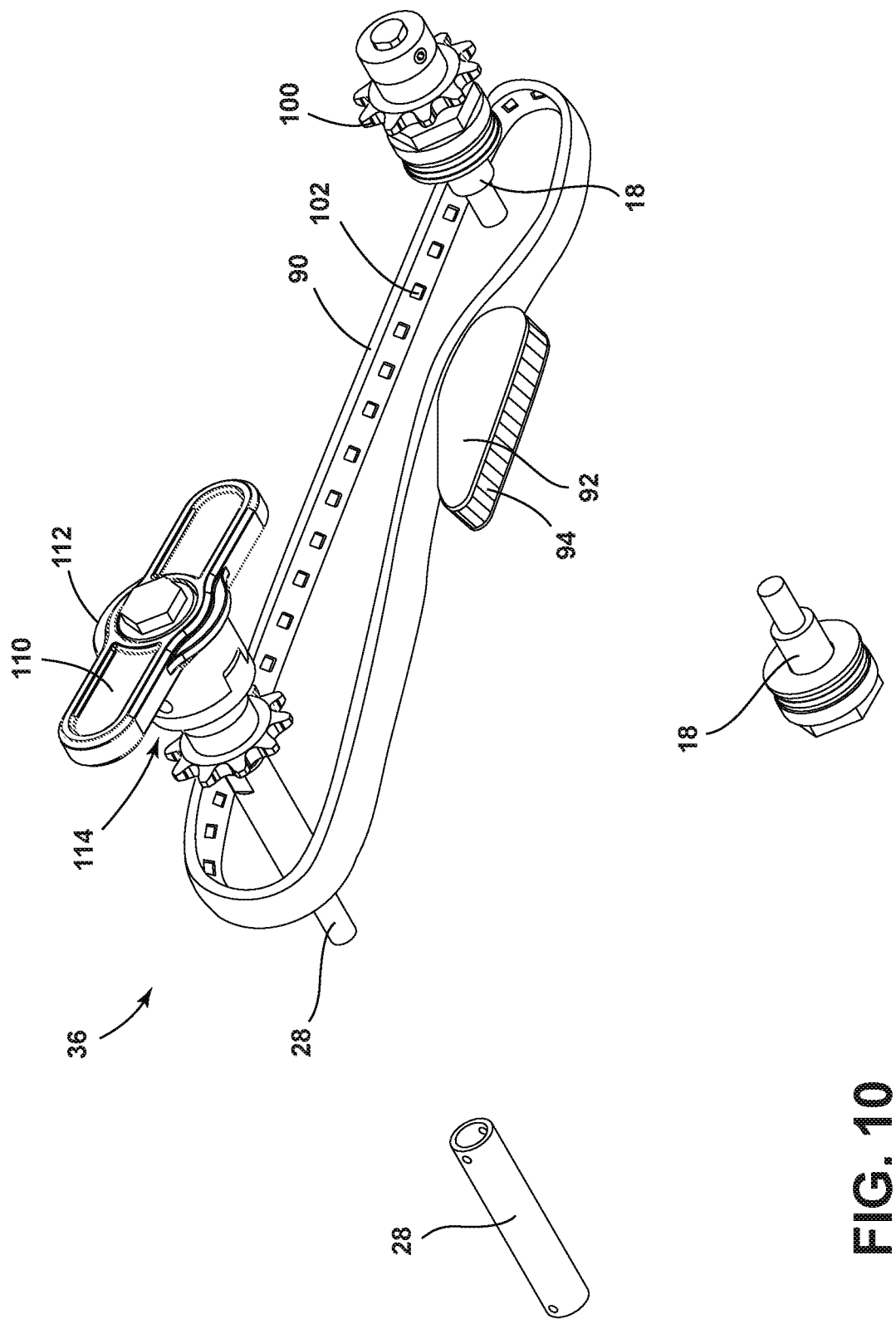
FIG. 10 is an enlarged and exploded perspective view of an embodiment of the leveling mechanism of an alternate embodiment of the multi-function grilling device.
Figure 13:
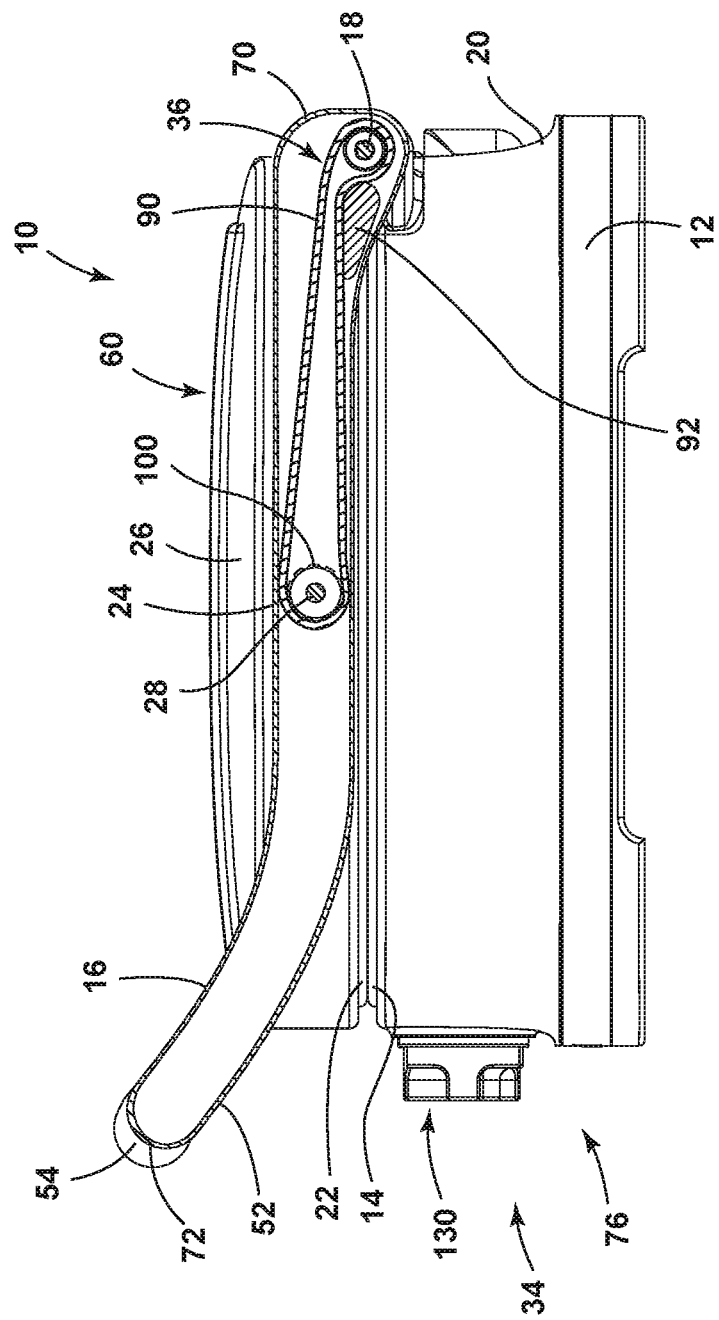
FIG. 13 is a cross-sectional view of the multi-function grilling device of FIG. 7 taken along line XIII-XIII.

Referring again to the embodiment illustrated in FIGS. 9, 10 and 13, the slidable outer surface 94 of the tensioning mechanism 92 disposed within the leveling mechanism 36 can be configured to allow the band 90 to easily move across the surface of the tensioning mechanism 92. Such slidable outer surfaces 94 can include, but are not limited to, lubricated surfaces, ball bearings, movable surfaces that slide along with the band 90 as it moves across the tensioning mechanism 92, cylinder bearings or other shaped bearings, or other similar slidable surfaces that allow for the easy movement of the band 90 across the slidable surface of the tensioning mechanism 92.

According to various embodiments, as illustrated in FIGS. 9-17, each of the primary and secondary pivots 18, 28 can include a plurality of cogs 100 that extend outward from the surface of each of the primary and secondary pivots 18, 28 to define gearing upon which the band 90 of the leveling mechanism 36 can be engaged and secured. Similarly, the band 90 can include various gearing recesses 102 that are configured to mesh with or otherwise engage the cogs 100 of each of the primary and secondary pivots 18, 28 to further prevent slippage of the band 90 about the primary and secondary pivots 18, 28 as the swing arm 16 is moved between the raised and lowered position 74, 76. As the swing arm 16 is moved between the raised and lowered position 74, 76, the engagement between the band 90 and the primary and secondary pivots 18, 28 causes the primary and secondary pivots 18, 28 to maintain a fixed rotational orientation relative to one another. The resulting engagement between the band 90 and the primary and secondary pivots 18, 28 results in the operable upper heating plate 22 maintaining a parallel configuration relative to the lower heating plate 14 as the swing arm 16 is moved about the primary pivot 18.

According to the various embodiments, the band 90 can include various flexible and continuous members that can include, but are not limited to, chains, belts, flexible bands, and other similar continuous members that can be disposed about both of the primary and secondary pivots 18, 28.

Referring again to FIGS. 1-13, various components of the leveling mechanism 36 can be disposed within either of the left and right arm portions 50, 52 of the swing arm 16, or both. In this manner, the band 90, the tensioning mechanism 92, the cogs 100 of the primary and secondary pivots 18, 28, and other various components of the leveling mechanism 36 can be disposed within the left and right arm portion 50, 52 of the swing arm 16 to conceal these components from view. Additionally, placing these components of the leveling mechanism 36 within the swing arm 16 can serve to prevent dust, grease, food particles and other debris from interfering with the operation of the leveling mechanism 36.

Referring again to the embodiment of FIGS. 1-13, the swing arm 16 can include one or more gripping knobs 110 that extend outward from the left and right arm portions 50, 52 of the swing arm 16. Each gripping knob 110 of the swing arm 16 can include a release mechanism 112 that is adapted to disengage the leveling mechanism 36 from the secondary pivot 28 such that the operable upper heating plate 22 can be rotated about the secondary pivot 28 to manipulate the upper heating plate 22 between the various positions, including the adjacent face-up position 30, the stacked face-up position 32 and the face-down position 34, as well as others. The release mechanism 112 of the gripping knob 110 can include a switch, button, tab, or other similar manipulation device that, when engaged, allows the upper heating plate 22 to freely rotate about the secondary pivot 28. In the various embodiments, the gripping knob 110 can also include a locking mechanism 114 to lock the swing arm 16 in the closed position for storage or for maintaining the upper heating plate 22 in a desired position during a particular cooking function. When the operable upper heating plate 22 is in the closed position and ready for storage, the gripping knob 110 can be engaged to lock the upper heating plate 22 in place such that the multi-function grilling device 10 can be lifted by one or more of the gripping knobs 110 to be carried from one location to another. The multi-function grilling device 10 can also include one or more handles 116 attached to the housing 12.

According to various embodiments, the gripping knob 110 of the swing arm 16 can also be operated to disengage the leveling mechanism 36 through various movements of the gripping knob 110. Such movements can include, but are not limited to, pressing in of the gripping knob 110, pulling out of the gripping knob 110, twisting in a predetermined direction of the gripping knob 110, and other various movements. It is also contemplated that each of the left and right arm portions 50, 52 of the swing arm 16 can include independent gripping knobs 110 that are coupled with two separate leveling mechanisms 36 disposed in each of the left and right arm portions 50, 52 of the swing arm 16. In such an embodiment, each of the gripping knobs 110 can be configured to be disengaged to allow the upper heating plate 22 to rotate about the secondary pivot 28 within the intermediate portion 24 of the swing arm 16.

Referring again to the embodiment of FIGS. 1-8, the multi-function grilling device 10 can include a control 130 that is in selective communication with heating elements 132 that provide heat to each of the lower and upper heating plates 14, 22. In this manner, the control 130 is configured to set a first heating level 134 of the lower heating plate 14 and a second heating level 136 of the upper heating plate 22. According to the various embodiments, the first heating level 134 can be the same or different than the second heating level 136. It is contemplated that the control 130 for the multi-function grilling device 10 can include a plurality of heating programs. Certain programs of the multi-function grilling device 10 can provide for the independent setting of the first and second heating levels 134, 136 to be the same or different temperatures. Such a program will result in different cooking temperatures of each of the upper and lower heating plates 22, 14. Other heating programs of the multi-function grilling device 10 can be configured to cooperatively set the first and second heating levels 134, 136 of the respective lower and upper heating plates 14, 22 to be the same temperature. In such programs, a single control 130 can be used to set the first and second heating levels 134, 136 simultaneously. It is further contemplated that in programs where the first and second heating levels 134, 136 of the lower and upper heating plates 14, 22 are set independently, separate controls 130 can be used to set the first and second heating levels 134, 136 to the desired temperature.

Figure 14:
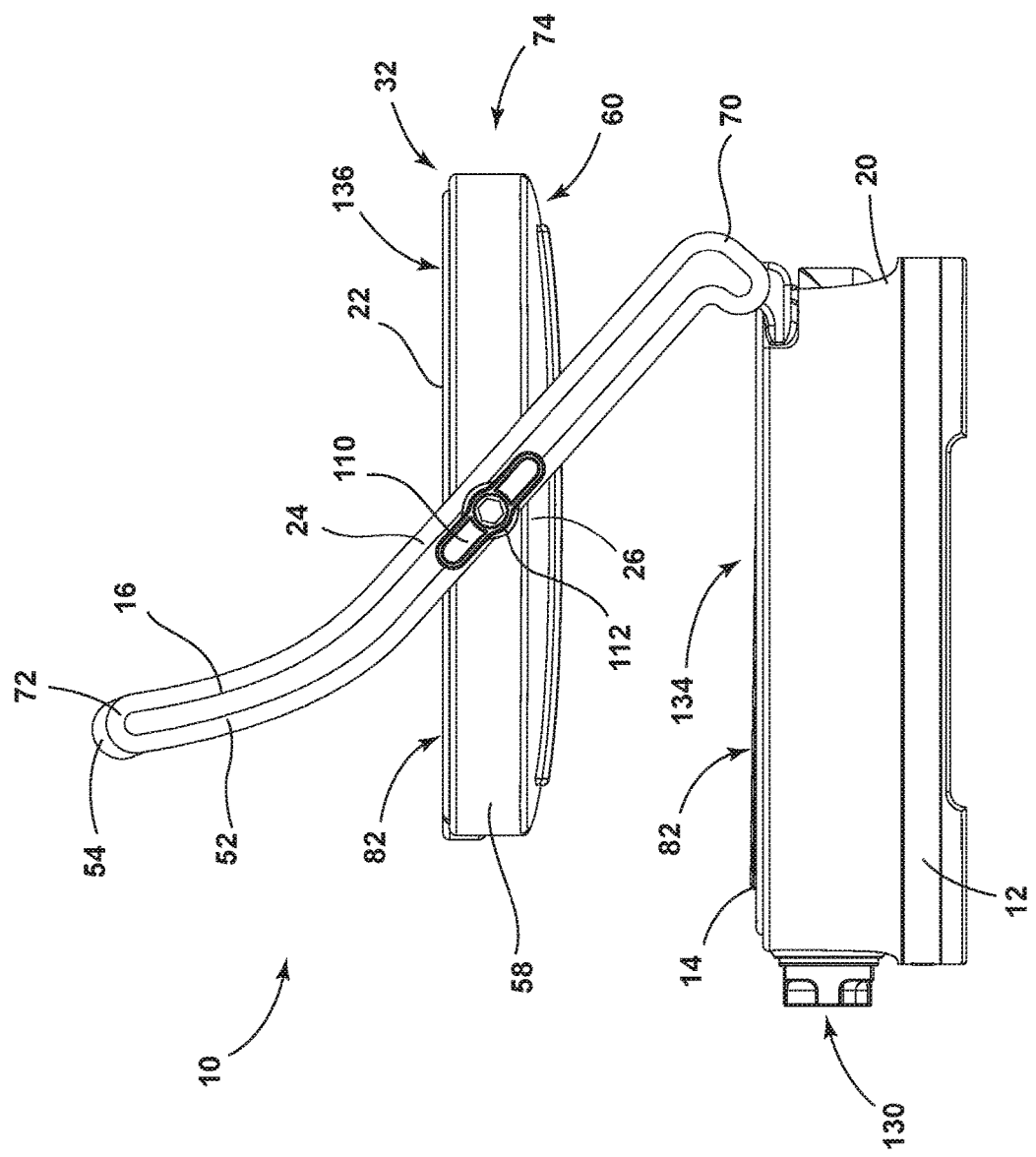
FIG. 14 is a side elevational view of an alternate embodiment of the multi-function grilling device with the operable upper heating plate disposed in a stacked face-up position.

According to various embodiments, it is further contemplated that certain programs of the multi-function grilling device 10 can include a predetermined heating pattern that automatically sets the first and second heating levels 134, 136 to a pre-programmed temperature for the upper and lower heating plates 22, 14. By way of explanation, and not limitation, when the upper and lower heating plates 22, 14 are disposed in the stacked face-up position 32 (as illustrated in FIG. 14), it is contemplated that the first heating level 134 of the lower heating plate 14 can be restricted such that the first upper limit of the first heating level 134 is less than a second upper limit of the second heating level 136 of the upper heating plate 22. In this manner, the diminished heating level of the lower heating plate 14 can serve to substantially prevent damage to the upper housing 60 surrounding the upper heating plate 22 when the upper heating plate 22 is in the stacked face-up position 32.

Referring now to the embodiment illustrated in FIG. 14, the face-down position 34 of the multi-function grilling device 10 includes a plurality of separate grilling positions that include, but are not limited to, the stacked face-up position 32, the face-down position 34, and the adjacent face-up position 30. It is contemplated that the stacked face-up position 32 can allow for a greater cooking surface area while also maintaining the multi-function grilling device 10 within a relatively small footprint. Additionally, the stacked face-up position 32 allows the user to easily cook food items simultaneously that may require different temperatures. It is further contemplated that the lower heating plate 14 in the stacked face-up position 32 can be used as a warming station to keep various food items warmed while other food items are cooked on the upward-facing upper heating plate 22.

Referring again to the embodiment of FIG. 14, the stacked face-up position 32 is defined by the operable cooking surface of the upper heating plate 22 facing upward and positioned over at least a portion of the upward-facing lower cooking surface 78 of the lower heating plate 14. This configuration allows for two separate heating zones 82 that can be independently controlled through separate controls 130 disposed on the housing 12 of the multi-function grilling device 10. As discussed above, it is contemplated that the upper limit of the first heating level 134 of the lower heating plate 14 is regulated to be lower in temperature to substantially prevent damage to the upper housing 60 surrounding the upper heating plate 22. The upper heating plate 22, in the stacked face-up position 32, can be configured to have a heating level typically higher than the heating level of the lower heating plate 14. These positions of the multi-function grilling device 10 can be achieved as the swing arm 16 moves from the closed to the open position. Depending on the position desired by the user, the swing arm 16 can be temporarily locked in one of several predetermined positions to allow the upper heating plate 22 to be maintained in the desired position. The swing arm 16 can be locked in place by a restrictive hinge disposed at the primary pivot 18, by a counterweight mechanism or by a locking mechanism 114 in communication with the swing arm 16, the gripping knob 110, the swing arm handle 54 or other component of the multi-function grilling device 10.

Figure 15:
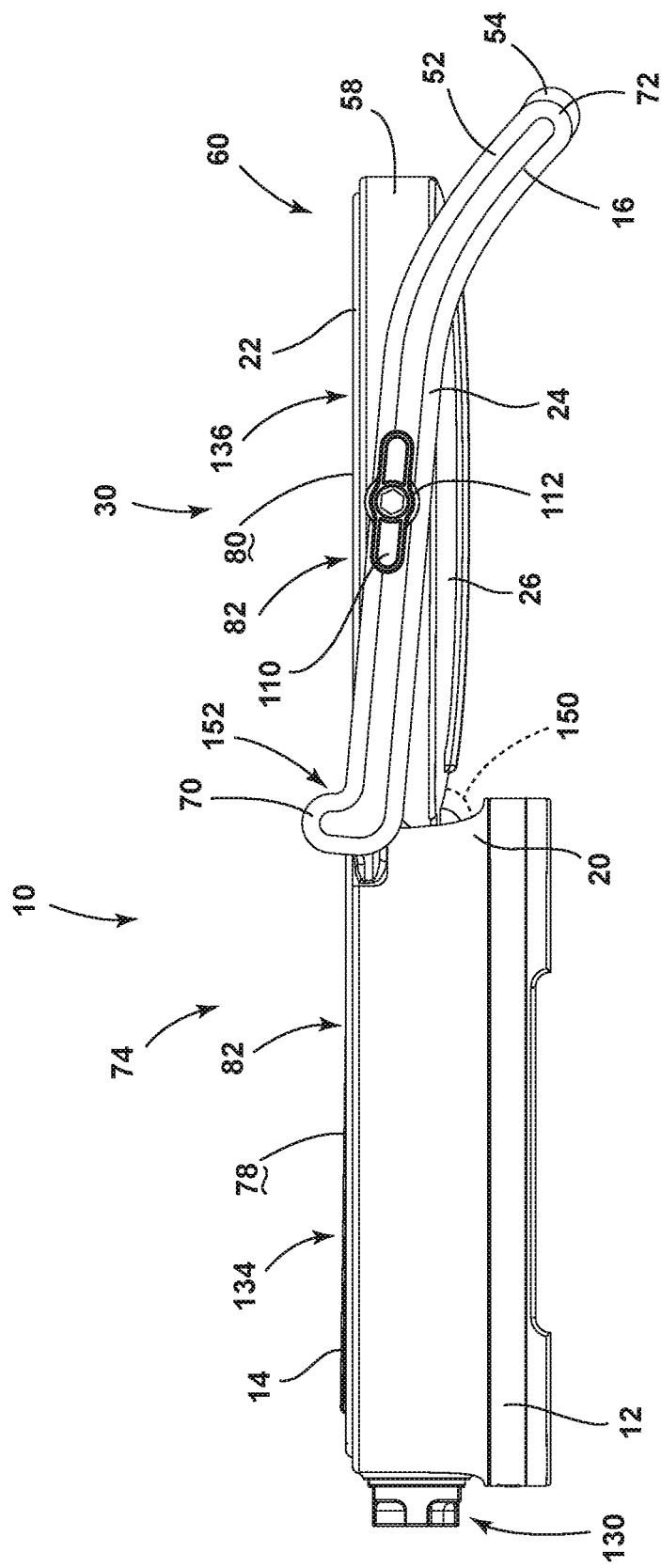
FIG. 15 is a side elevational view of the multi-function grilling device of FIG. 14 with the operable upper heating plate disposed in the adjacent face-up position.

Referring now to the embodiment illustrated in FIG. 15, the adjacent face-up position 30 of the multi-function grilling device 10 is defined by the operable cooking surface of the upper heating plate 22 being upward-facing in a position next to the upward-facing lower cooking surface 78 of the lower heating plate 14. In this manner, the lower cooking surface 78 of the lower heating plate 14 is substantially parallel with and substantially within the same horizontal plane as the operable cooking surface of the upper heating plate 22. The resulting configuration can include a single continuous cooking surface where the upper and lower heating plates 22, 14 can be controlled independently to provide two cooking zones with different temperatures, or can be controlled cooperatively to define a single larger cooking zone with a single heating temperature.

According to various embodiments, as illustrated in FIG. 15, the upper and lower heating plates 22, 14 can be slightly tilted toward one another such that a grease or debris trap 150 can be disposed between the upper and lower heating plates 22, 14 when disposed in the adjacent face-up position 30. In this manner, as various food items are cooked, grease, fluid, food, and other debris can be directed to a channel 152 defined between the upper and lower heating plates 22, 14. At the base of the channel 152, a trap 150 can be disposed to capture the various debris that can be released by the food items being cooked upon the upper and lower heating plates 22, 14. It is contemplated that the debris trap 150 of the multi-function grilling device 10 disposed in the adjacent face-up position 30 can be an integral portion of either the housing 12 surrounding the upper heating plate 22 or the housing 12 surrounding the lower heating plate 14. Alternatively, the debris trap 150 can be a separate fixture that can be disposed beneath the channel 152 defined between the upper and lower heating plates 22, 14 when positioned in the adjacent face-up position 30.

Figure 16:
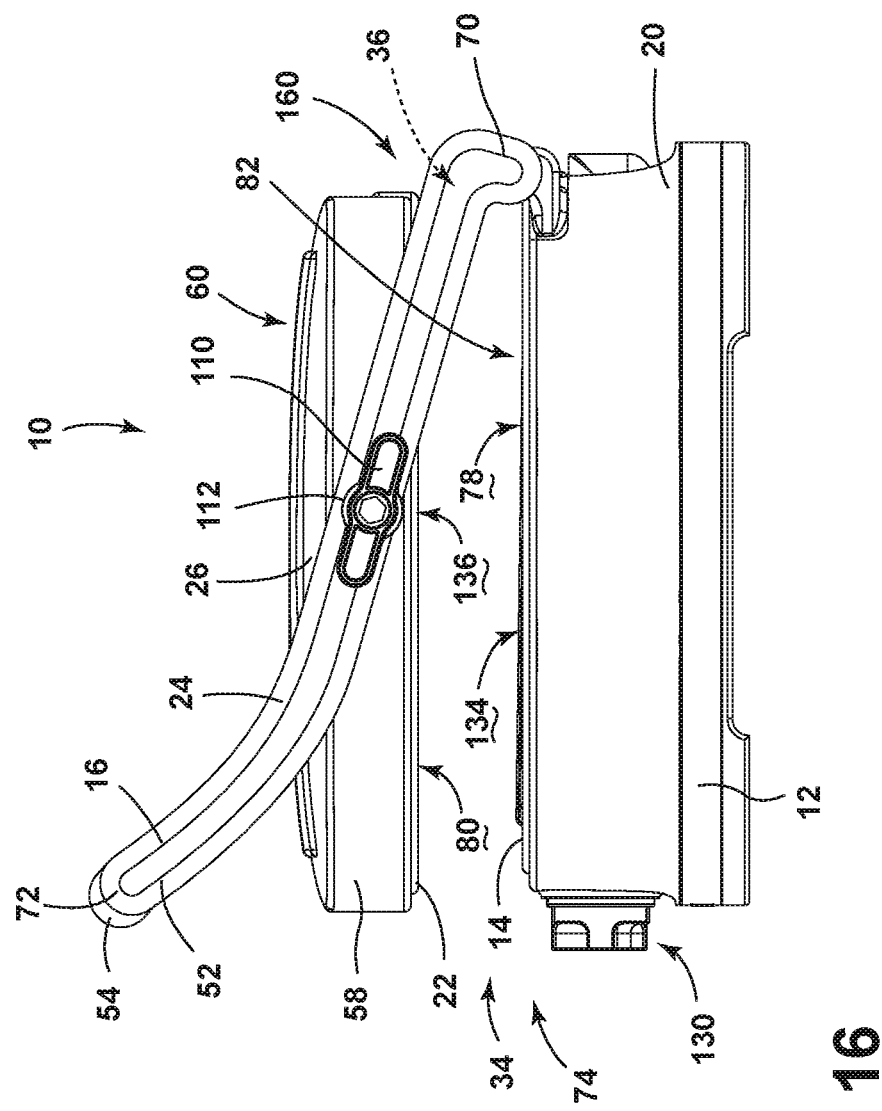
FIG. 16 is a side elevational view of another alternate embodiment of the multi-function grilling device with the operable upper heating plate disposed in the face-down position and a swing arm within the parallel rotational section of the primary pivot.

Referring now to the embodiment illustrated in FIG. 16, the face-down position 34 of the multi-function grilling device 10 is defined by the operable cooking surface of the upper heating plate 22 being rotatable about at least a portion of the primary pivot 18. In this position, the operable cooking surface of the upper heating plate 22 is downward-facing and substantially parallel with the upward-facing lower cooking surface 78 of the lower heating plate 14. In such an embodiment, the swing arm 16 can be moved between the upper and lower positions to open and close the multi-function grilling device 10. In this manner, as the swing arm 16 is raised, the leveling mechanism 36 of the multi-function grilling device 10 causes the upper heating plate 22 to maintain a parallel configuration with the lower heating plate 14. Because of this continuous parallel configuration between the upper and lower heating plates 22, 14, the cooking area defined between the upper and lower heating plates 22, 14 maintains a substantially level configuration such that the upper and lower heating plates 22, 14 evenly engage a food item, such as a sandwich, placed in the heating zone 82 between the upper and lower heating plates 22, 14. It is contemplated that where various food items do not include parallel top and bottom surfaces, the upper heating plate 22 can be rotated by disengaging the leveling mechanism 36 through the use of the gripping knob 110 in order to cause the upper and lower heating plates 22, 14 to engage the food item in a substantially flush manner, such that the upper and lower heating plates 22, 14 can evenly cook the food item placed therebetween. The parallel configuration of the upper and lower heating plates 22, 14 serves to place an even amount of pressure upon the food items placed within the multi-function grilling device 10. The even amount of pressure, in turn, helps to ensure that an even amount of heat is distributed across the entire surface of the food item.

In various embodiments, it is contemplated that the upper and lower heating plates 22, 14 can be configured to include a certain amount of play within the respective housing 12 such that the housing 12 surrounding the upper heating plate 22 is maintained in a substantially parallel configuration with the lower heating plate 14, but the operable cooking surface of the upper heating plate 22 is afforded some limited movement within the upper housing 60 to account for variations within the food item placed between the upper and lower heating plates 22, 14. In this manner, an even amount of heat can be delivered to food items having various shapes.

Figure 17:
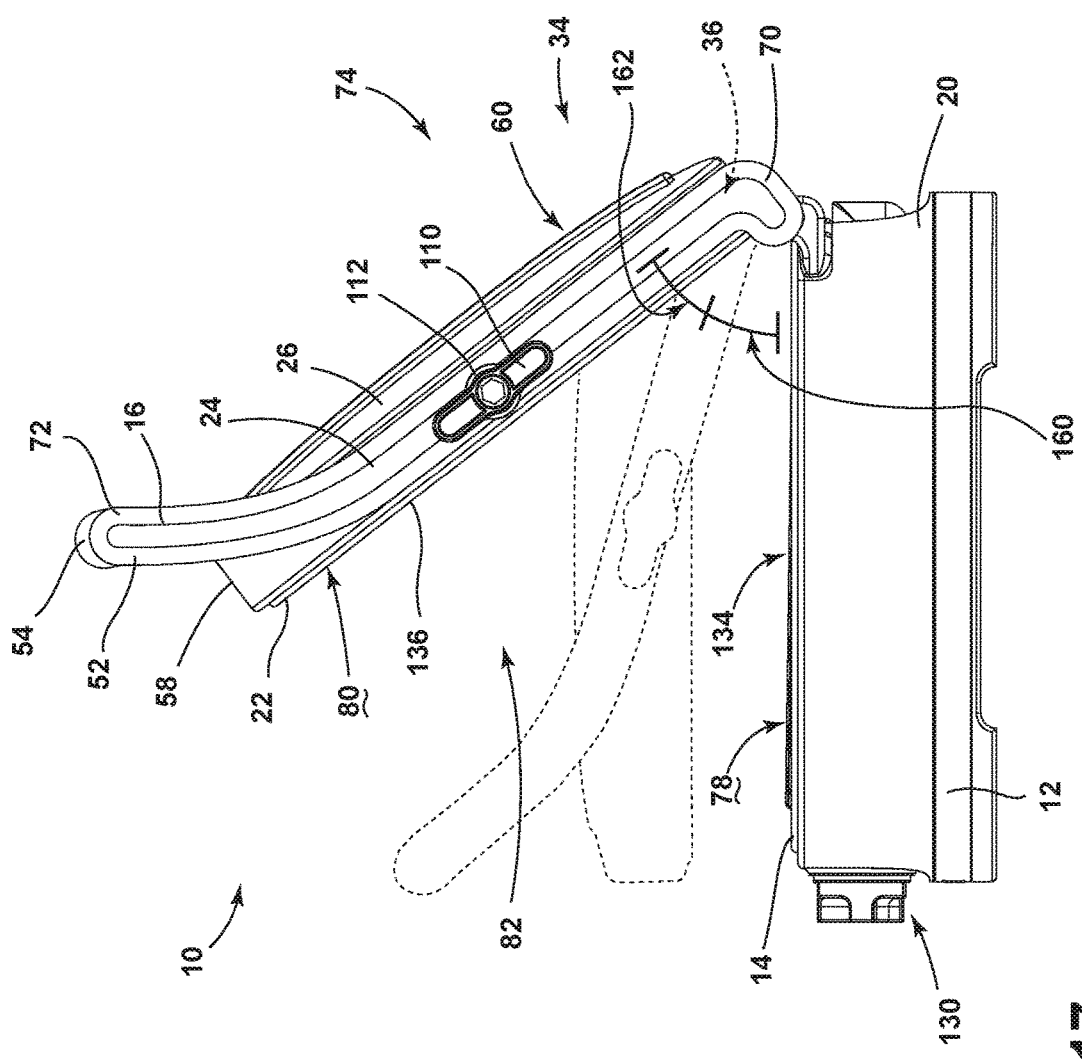
FIG. 17 is a side elevational view of the multi-function grilling device of FIG. 16 with the operable upper heating plate disposed in the face-down position and the swing arm disposed in the clamshell rotational section about the primary pivot.

Referring now to the embodiment illustrated in FIGS. 16 and 17, it is contemplated that the face-down position 34 of the multi-function grilling device 10 can include a composite movement of the upper heating plate 22 as the swing arm 16 is moved between the closed and open position. In such an embodiment, the face-down position 34 of the multi-function grilling device 10 can include a parallel rotational section 160 that is defined by the upper heating plate 22 being disposed relatively close and in parallel configuration with the lower heating plate 14. This parallel rotational section 160 can be defined as the swing arm 16 rotates through this portion of the primary pivot 18. In the parallel rotational section 160 of the primary pivot 18, the leveling mechanism 36 is engaged to cause the upper heating plate 22 to maintain a parallel configuration with the lower heating plate 14. This parallel rotational section 160 of the pivot can be further defined by the upper heating plate 22 being in a closed position such that the upper heating plate 22 is engaged with the lower heating plate 14. As the swing arm 16 is moved upward from the closed position, the leveling mechanism 36 disposed within the swing arm 16 maintains the upper heating plate 22 in a parallel configuration with the lower heating plate 14 as the swing arm 16 moves upward through the parallel rotational section 160.

Referring again to FIGS. 16 and 17, the face-down position 34 can also include a clamshell rotational section 162 where the upper heating plate 22 is substantially distal from the lower heating plate 14 and the leveling mechanism 36 is disengaged such that the upper heating plate 22 becomes rotationally fixed in relation to the swing arm 16 to rotate upward in a clamshell-type rotational configuration. The clamshell rotational section 162 is defined by the swing arm 16 moving completely through the parallel rotational section 160 of the primary pivot 18. Once the swing arm 16 is rotated through the parallel rotational section 160 and enters the clamshell rotational section 162, the leveling mechanism 36 becomes disengaged and the upper heating plate 22 is placed in a fixed rotational position relative to the swing arm 16.

Referring again to the embodiment of FIG. 17, it is contemplated that when the swing arm 16 moves into the clamshell rotational section 162 of the primary pivot 18, the upper heating plate 22 can be biased into a substantially parallel configuration with the intermediate portion 24 of the swing arm 16. This alignment between the upper heating plate 22 and the intermediate portion 24 of the swing arm 16 as the swing arm 16 moves to the clamshell rotational section 162, allows the upper heating plate 22 to be moved farther away from the lower heating plate 14 to provide a greater opportunity for the user of the multi-function grilling device 10 to access the heating zone 82 of the multi-function grilling device 10 and place food items within, remove food items from, or observe food items within the multi-function grilling device 10. When the swing arm 16 is moved from the clamshell rotational section 162 of the primary pivot 18 and back into the parallel rotational section 160 of the primary pivot 18, the upper heating plate 22 is biased back into a parallel configuration with the lower heating plate 14. The leveling mechanism 36 is then reengaged to maintain a level alignment between the upper heating plate 22 and the lower heating plate 14 as the swing arm 16 is moved through the parallel rotational section 160 of the primary pivot 18. The movement of the upper heating plate 22 as the swing arm 16 moves from the closed position, through the parallel rotational section 160, into the clamshell rotational section 162, can be controlled by various mechanisms that include, but are not limited to, gearing mechanisms, springs, belt-driven mechanisms, rack-and-pinion mechanisms, drive trains, combinations of various mechanisms, and other similar mechanisms that can provide for this compound movement of the upper heating plate 22 as it moves through the parallel and clamshell rotational sections 160, 162 of the primary pivot 18.

In the various embodiments, the control 130 of the multi-function grilling device 10 can include any one of various controlling mechanisms including, but not limited to, knobs, dials, switches, resistive or capacitive touch screens and other various user interfaces. The control 130 can also include a graphic display that includes various indicia configured to instruct the user on the various information concerning the multi-function grilling device 10. Such information can include, but is not limited to, the temperature of each of the upper and lower heating plates 22, 14, a desired cooking time, a pre-programmed cooking function that has been selected, and other various information. The control 130 can also include various pre-programmed functions that are configured to cook various predetermined food items. Such predetermined functions can include a sandwich function, meat function, grill function, Panini grill function, griddle function, raclette function, and other various functions of the multi-function grilling device 10.

According to various embodiments, each of the upper and lower heating plates 22, 14 can be configured to be removable from the respective portions of the housing 12 of the multi-function grilling device 10. Additionally, the removability of the upper and lower heating plates 22, 14 can allow for easy clean-up and washing of the upper and lower heating plates 22, 14 as well as removal of debris from the housing 12 that may fall or otherwise become lodged within the housing 12 of the multi-function grilling device 10.

Figure 11:
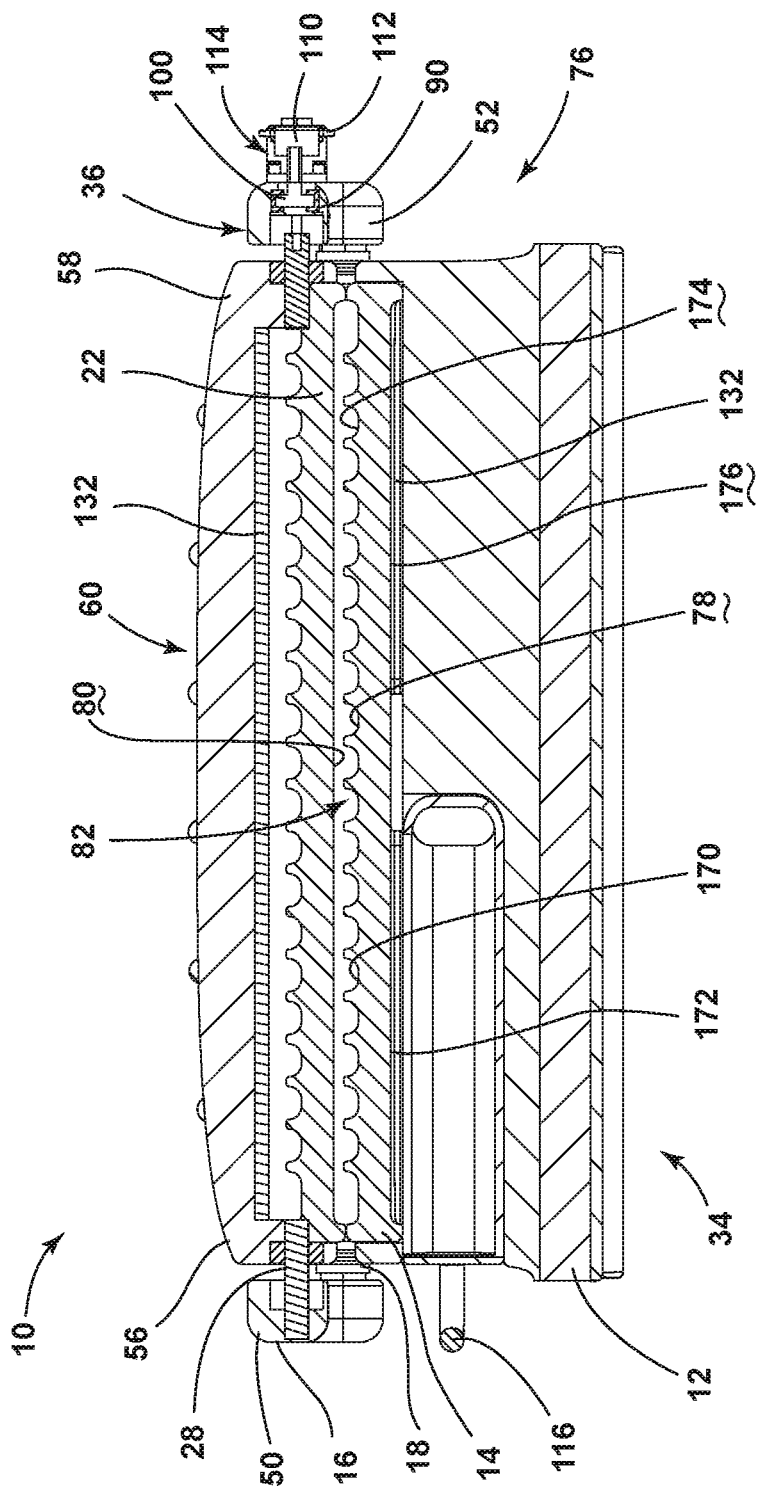
FIG. 11 is a cross-sectional view of the multi-function grilling device of FIG. 7 taken along line XI-XI.
Figure 12:
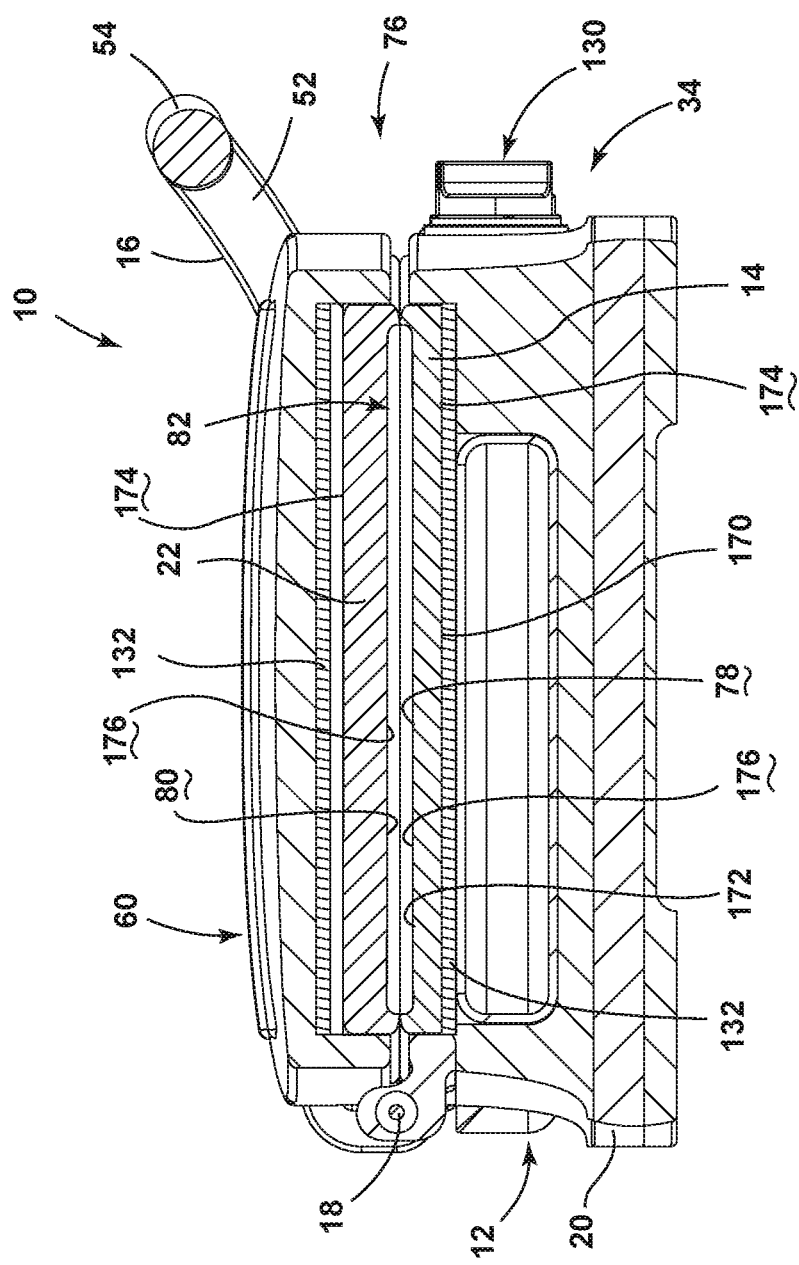
FIG. 12 is a cross-sectional view of the multi-function grilling device of FIG. 8 taken along line XII-XII.

According to various embodiments, as illustrated in FIGS. 9, 11 and 12, the upper and lower heating plates 22, 14 can be reversible to expose different cooking surfaces defined within the first and second sides 170, 172 of each of the upper and lower heating plates 22, 14. One such cooking surface can include a ridged grilling surface 174 that includes a plurality of grilling ridges. Another such cooking surface can include a substantially planar griddle surface 176. Other cooking surfaces are also contemplated that include, but are not limited by, a waffle cooking surface, a tilted cooking surface, various textured cooking surfaces, and others. In the various embodiments, the upper and lower heating plates 22, 14 can be removed from the respective housing, flipped over to expose an alternate grilling surface and reinstalled into the respective housing 12.

According to the various embodiments, each respective portion of the housing 12 proximate the lower and upper heating plates 14, 22 of the multi-function grilling device 10 can include one or more dedicated heating elements 132 that are in communication with the control 130 of the multi-function grilling device 10. It is contemplated that each of the upper and lower heating plates 22, 14 can include cooking zones that correspond to individual heating elements 132 disposed within the respective portions of the housing 12. Accordingly, when the multi-function grilling device 10 is disposed within the griddle mode, or the adjacent face-up position 30, the upper and lower heating plates 22, 14 can define two or more individual cooking zones that can provide varying heating temperatures within each respective cooking zone.

In the various embodiments, it is contemplated that the swing arm 16 of the multi-function grilling device 10 can include a biasing or counterweight mechanism that biases the movement of the swing arm 16 into the open position such that the biasing or countering mechanism of the swing arm 16 can assist the user in moving the swing arm 16 into the open position to access the cooking area defined between the upper and lower heating plates 22, 14. The biasing or counterweight mechanism can also assist the user in maintaining a controlled descent of the swing arm 16 from the open position to the closed position in order to cook various food items placed between the upper and lower heating plates 22, 14.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A grilling device comprising:
a housing including a fixed lower heating plate and a rotatable swing arm coupled to a primary pivot positioned on a rear end of the housing;
an operable upper heating plate coupled to the swing arm such that an intermediate portion of the swing arm rotationally engages a central portion of the upper heating plate at a secondary pivot to define an adjacent face-up position wherein the upper heating plate is next to the fixed lower heating plate and facing upward, a stacked face-up position wherein the upper heating plate is above the fixed lower heating plate and facing upward and a face-down position wherein the upper heating plate is facing downward; and
a leveling mechanism that maintains the upper heating plate in parallel with the fixed lower heating plate as the swing arm operates about at least a portion of the primary pivot, wherein the leveling mechanism includes a band disposed around the primary and secondary pivots and within the swing arm, and a tensioning block having a slidable outer surface that intrudes into a path of the band and deflects at least a portion of the band and wraps the band greater than 180 degrees about each of the primary and secondary pivots to limit slippage by the band as the swing arm is moved between the adjacent face-up position, the stacked face-up position, and the face-down position, wherein the tensioning block is disposed within the swing arm and maintains a fixed rotational orientation between the primary and secondary pivots as the swing arm operates about at least the portion of the primary pivot.

2. The grilling device of claim 1, further comprising:
a control in selective communication with each of the fixed lower heating plate and the upper heating plate, wherein the control sets a first heating level of the fixed lower heating plate, and wherein the control sets a second heating level of the upper heating plate.

3. The grilling device of claim 2, wherein a first upper limit of the first heating level is less than a second upper limit of the second heating level when the upper heating plate is disposed in the stacked face-up position.

4. The grilling device of claim 1, wherein the face-down position includes a parallel rotational section wherein the upper heating plate is disposed proximate and parallel with the fixed lower heating plate as the swing arm rotates about a parallel rotation portion of the primary pivot, and wherein the face-down position further includes a clamshell rotational section wherein the upper heating plate is distal from the fixed lower heating plate and is further defined by the leveling mechanism being free of rotational operation such that the upper heating plate is rotationally fixed in relation to the swing arm as the swing arm rotates about a clamshell rotation portion of the primary pivot.

5. The grilling device of claim 1, wherein the adjacent face-up position is defined by the upper and fixed lower heating plates being in an upward-facing position, and wherein a lower cooking surface of the fixed lower heating plate is substantially parallel with and substantially within the same horizontal plane as an operable cooking surface of the upper heating plate.

6. A grilling device comprising:
a lower heating plate;
an upper heating plate operably coupled to the lower heating plate by a swing arm, wherein the upper heating plate is rotatable about an intermediate portion of the swing arm between an adjacent face-up position wherein the upper heating plate is next to the lower heating plate and facing upward, a stacked face-up position wherein the upper heating plate is above the lower heating plate and facing upward, and a face-down position wherein the upper heating plate is facing downward; and
a leveling mechanism configured to maintain the upper heating plate in a parallel configuration with the lower heating plate as the swing arm moves at least partially about a primary pivot disposed proximate the lower heating plate, wherein the leveling mechanism includes a band that wraps at least partially around the primary pivot and a secondary pivot positioned at a central portion of the upper heating plate and the intermediate portion of the swing arm, and wherein the leveling mechanism further includes a tensioning block that deflects a portion of the band to wrap the band about at least one of the primary and secondary pivots more than 180 degrees to limit slippage by the band as the swing arm is moved between the adjacent face-up position, the stacked face-up position, and the face-down position, and wherein the band and the tensioning block are disposed within the swing arm.

7. The grilling device of claim 6, wherein the band includes a chain and the primary and secondary pivots each include gears having a plurality of cogs that cooperatively mesh with the chain.

8. The grilling device of claim 6, wherein the secondary pivot includes a release mechanism that selectively disengages the leveling mechanism from the upper heating plate to position the upper heating plate between at least the adjacent face-up position, the stacked face-up position, and the face-down position.

9. The grilling device of claim 6, further comprising:
a control in selective communication with each of the lower heating plate and the upper heating plate, wherein the control sets a first heating level of the lower heating plate, and wherein the control sets a second heating level of the upper heating plate.

10. The grilling device of claim 9, wherein the control includes a plurality of heating programs, wherein a first portion of the plurality of heating programs is defined by the first heating level and the second heating level being set independently from one another, and wherein a second portion of the plurality of heating programs is defined by the first heating level and the second heating level being cooperatively set.

11. The grilling device of claim 6, wherein the face-down position includes a parallel rotational section wherein the upper heating plate is disposed proximate and parallel with the lower heating plate as the swing arm rotates about a parallel rotation portion of the primary pivot, and wherein the face-down position further includes a clamshell rotational section wherein the upper heating plate is distal from the lower heating plate and is further defined by the leveling mechanism being inoperative in relation to the swing arm and the upper heating plate such that the upper heating plate is rotationally fixed in relation to the swing arm as the swing arm rotates about a clamshell rotation portion of the primary pivot.

12. A multi-function grilling device comprising:
an upward-facing lower cooking surface;

an operable cooking surface rotatable about a functional pivot between a plurality of rotational positions;

a swing arm rotatable about a primary pivot and extending from the upward-facing lower cooking surface to at least the functional pivot, wherein the swing arm and the plurality of rotational positions of the operable cooking surface cooperate to define at least a stacked face-up position wherein the operable cooking surface is above the upward-facing lower cooking surface and faces upward and a face-down position wherein the operable cooking surface faces downward; and a leveling mechanism that includes a band that at least partially encircles a portion of the primary pivot and the functional pivot, wherein the leveling mechanism maintains the operable cooking surface and the upward-facing lower cooking surface in a parallel configuration as the swing arm pivots at least partially about the primary pivot, and wherein the band is disposed within the swing arm and encircles the primary and functional pivots within the swing arm, and the leveling mechanism further includes a tensioning block, wherein the tensioning block deflects the band to wrap about at least one of the primary and functional pivots more than 180 degrees to limit slippage by the band as the swing arm is moved between the adjacent face-up position, the stacked face-up position, and the face-down position.

13. The multi-function grilling device of claim 12, wherein the swing arm and the plurality of rotational positions of the operable cooking surface cooperate to further define an adjacent face-up position wherein the operable cooking surface faces upward next to the upward-facing lower cooking surface.

14. The multi-function grilling device of claim 13, wherein the stacked face-up position is defined by the operable cooking surface being upward-facing and positioned over at least a portion of the upward-facing lower cooking surface, wherein the face-down position is defined by the operable cooking surface being rotatable about at least a parallel rotation portion of the primary pivot, wherein the operable cooking surface is downward-facing and parallel with the upward-facing lower cooking surface, and wherein the adjacent face-up position is defined by the operable cooking surface being upward-facing and positioned next to the upward-facing lower cooking surface.

15. The multi-function grilling device of claim 14, wherein the face-down position is further defined by the operable cooking surface being rotatable about a clamshell rotation portion of the primary pivot, wherein the operable cooking surface is rotationally fixed in relation to the swing arm, and wherein the parallel rotation portion of the primary pivot places the operable cooking surface nearer the upward-facing lower cooking surface than the clamshell rotation portion of the primary pivot.

16. The multi-function grilling device of claim 15, wherein the leveling mechanism is inoperative in relation to the primary and functional pivots when the operable cooking surface is in the face-down position and the swing arm rotates about the primary pivot through the clamshell rotation portion of the primary pivot.

\* \* \* \* \*